United States Patent [19]

Kahn

[11] Patent Number: 5,394,274
[45] Date of Patent: Feb. 28, 1995

[54] ANTI-COPY SYSTEM UTILIZING AUDIBLE AND INAUDIBLE PROTECTION SIGNALS

[76] Inventor: Leonard R. Kahn, 137 E. 36th St., New York, N.Y. 10016

[21] Appl. No.: 46,196

[22] Filed: Apr. 13, 1993

Related U.S. Application Data

[63] Continuation-in-part of Ser. No. 393,300, Aug. 14, 1989, abandoned, which is a continuation-in-part of Ser. No. 147,141, Jan. 22, 1988, abandoned.

[51] Int. Cl.[6] .................... G11B 5/02; G11B 15/04; G11B 19/04; G11B 23/28
[52] U.S. Cl. .................................. 360/27; 360/60; 380/3
[58] Field of Search .............. 360/60, 15, 27, 28, 360/29, 69, 14.1; 380/3, 4, 22; 332/23, 38; 178/5.1; 455/59; 358/122, 319; 340/825.34; 179/2

[56] References Cited

U.S. PATENT DOCUMENTS

| | | | |
|---|---|---|---|
| 2,624,041 | 12/1952 | Evans | 332/23 |
| 3,004,104 | 10/1961 | Hembrooke | 179/2 |
| 3,060,389 | 10/1962 | Kahn | 332/38 |
| 3,333,052 | 7/1967 | Kahn | 178/5.1 |
| 4,040,099 | 8/1977 | Cook | 360/60 X |
| 4,086,634 | 4/1978 | Cook | 360/60 X |
| 4,217,661 | 8/1980 | Kahn | 455/59 |
| 4,305,101 | 12/1981 | Yarbrough et al. | 360/60 |
| 4,488,183 | 12/1984 | Kinjo | 360/60 X |
| 4,533,949 | 8/1985 | Fujimura et al. | 358/122 |
| 4,598,288 | 7/1986 | Yarbrough et al. | 360/60 X |
| 4,644,422 | 2/1987 | Bedini | 360/60 |
| 4,663,674 | 5/1987 | Osawa | 360/60 X |
| 4,755,901 | 10/1988 | Nakano | 360/60 |
| 4,802,212 | 1/1989 | Freeman et al. | 380/3 |

FOREIGN PATENT DOCUMENTS 0741333 11/1955 United Kingdom .
1525292 9/1978 United Kingdom .

OTHER PUBLICATIONS

"Information Transmission, Modulation, and Noise" by Mischa Schwartz, McGraw Hill, 1959, P. 110, P. 154 *No month provided.

"Electronic Designers Handbook" by Landee et al. *No Month Provided. McGraw Hill, 1957, pp. 5–22, to 5–25 inclusive.

"Auto Disc. Scratch Filter" by J. A. Arnoud Inspec. Dec. 9, 1976, A11.

"Record Industry Unveils Device to Block Copying" The Washington Post, Martha M. Hamilton, Mar. 26, 1986, p. G3

Primary Examiner—John Shepperd
Assistant Examiner—Patrick Wamsley

[57] ABSTRACT

A system for preventing the unauthorized copying of audio or video recording by (1) processing the recorded material so as to identify the protected material in a manner that does not audibly distort the program material, and (2) processing the recorded material by a second method that produces audible artifacts. Equipment capable of removing the audible artifacts while retaining the inaudible identification signal would be installed in audio digital tape recorders or video recorders so as to allow the equipment to be used for playback purposes while at the same time discouraging the unauthorized copying of audio, video or motion picture protected material.

33 Claims, 7 Drawing Sheets

FIG. 8

ANTI-COPY SYSTEM UTILIZING AUDIBLE AND INAUDIBLE PROTECTION SIGNALS

RELATED APPLICATIONS

This application is a continuation-in-part of application Ser. No. 07/393,300, entitled "Anti-Copying Device", filed Aug. 14, 1989, now abandoned. Prior application Ser. No. 07/393,300 was a continuation-in-part of application Ser. No. 07/147,141, entitled "Anti-Copying Device", filed Jan. 22, 1988, now abandoned.

The following application Ser. Nos., all now abandoned, are related to the instant invention: 07/423,959, filed Oct. 20, 1989, entitled "Anti-Copying System Utilizing Audible and Inaudible Protection Signals"; 07/159,731, filed Feb. 24, 1988, entitled "Record Copy Protection System"; and 07/149,854, filed Jan. 29, 1988, entitled "Anti-Copying Device Based on the Masking Phenomena".

BACKGROUND OF THE INVENTION

While the invention is subject to a wide range of applications, it is especially suitable for use in processing pre-recorded digital audio tapes and with digital audio tape recording equipment that requires an anti-copying feature.

Very high fidelity digital audio tape (DAT) recording techniques have been recently developed. However, such tape devices present a severe problem for organizations engaged in manufacturing and/or marketing of pre-recorded music and other program material.

The recordings made by such consumer type DAT recorders are of such high quality that it is difficult, if not impossible, for listeners to differentiate between the original recorded tapes and copies. This causes serious problems for firms producing or marketing pre-recorded tapes or compact disks for sale to the public because the sale of a single tape or compact disk can lead to literally hundreds of unauthorized copies.

CBS Laboratories has suggested a solution to the problem. CBS proposed that the program material be specially processed so as to identify the pre-recorded material. This identification would cause consumer tape recorders to be switched off.

The CBS method provides identification by eliminating a narrow band of speech and music components. In other words, a hole is introduced in the spectrum. Unfortunately, such spectrum holes are, under certain conditions, audible. Indeed, Kahn U.S. Patent #4,217,661 discloses a method for eliminating cuts or holes in the frequency response of telephone line frequency extenders. In laboratory tests, conducted by Kahn Communications, Inc., of Carle Place, N.Y., on such equipment, a significant improvement was noted in the sound quality of voice and music signals transmitted through such equipment. Thus, it is apparent that listeners can hear cuts or holes in frequency response.

SUMMARY OF THE INVENTION

The present invention substantially obviates the limitations and disadvantages of the prior art arrangements.

The methods described herein and other means for providing inaudible identifying signals will provide protection from theft of protected material if tape recorders incorporate the necessary protection circuitry. However, it is obvious that absent Government regulation or strict self-policing by the recorder manufacturing industry, such protection systems can be readily circumvented by individuals using recorders not incorporating protection circuitry.

Therefore, another layer of protection is required that will induce manufacturers to install suitable anti-theft circuitry in recorders.

In preferred embodiments of the instant invention, one of the disclosed inaudible protection processing systems would be used in conjunction with a method of producing audible artifacts.

Audible artifacts, as used herein, are defined as undesired sounds that are not part of the desired program material that may be heard by at least a substantial number of listeners. These artifacts are purposely introduced into the protected recordings so as to insure that the recordings will be played back through equipment that incorporates protection against unauthorized copying.

Thus, the present invention introduces artifacts that would disturb listeners to the pre-recorded tapes unless the playback machine is properly equipped with means for eliminating or substantially reducing the undesired artifacts. These undesired sounds include, high-pitched whistles, improper equalization effects, forms of non-linear distortion, frequency translation and, as discussed below, clicks.

Organizations producing pre-recorded music by combining inaudible and audible processing would then create a market for playback equipment that incorporates circuitry to remove the undesired audible artifacts. Integrated circuits would be designed that would serve two purposes; (1) remove the undesired artifacts, and (2) interfere with the copying of protected program material.

Manufacturers of tape recorders would then have a competitive reason for installing the anti-copying protection circuitry. Absent the audible artifacts, manufacturers would not have any pressure from their customers to incorporate protection circuitry.

Audible and inaudible artifacts can be introduced in the analog segment of the signal flow or the digital stream of the recording system, or both. It should be stressed that one inaudible identifying signal should survive the digital to analog conversion in the playback system in order to maintain full protection.

As discussed supra, there are a number of means for providing inaudible identification signals that may be used to implement this invention.

There are also a number of types of audible artifacts that may be implemented and that may be introduced in either the analog or digital section of the recording process. Examples of such artifacts are: the addition of one or more tones, unusual and disturbing frequency response modification, nonlinear distortions such as harmonic distortion, audible wow or flutter effects, frequency shifts, etc. Furthermore, in the digital stream, it is possible to add pulses, shift pulse rates, violate coding rules, distort pulses, etc. One preferred method is to add "clicks" to the program as described below.

One skilled in the recording and high fidelity art, will recognize the vast assortment of possible approaches to providing audible artifacts but they must satisfy the following:

a) The audible artifacts must be of a nature that can be removed or at least be attenuated sufficiently so as to be rendered inaudible.

b) The circuitry needed for removing or attenuating the artifacts must be inexpensive and can be readily integrated into consumer playback equipment.

c) The signal that creates the audible artifacts should provide information as to its presence so as to activate circuitry that removes or at least attenuates the audible artifacts to a degree where they are no longer audible.

The (c) requirement can, however, be met by providing an additional signal, for example, a tone burst outside the frequency range of audible sounds or say a signature in the data stream.

One preferred audible artifact is a recurring series of clicks either introduced in the analog or digital segments of the recording. Even an occasional click is very disturbing to most listeners and would have to be removed before most listeners would find the playback quality acceptable. Furthermore, recordings with clicks would not be acceptable for copying purposes. Eliminating short duration clicks when their timing is known, is relatively easy to accomplish.

Figure 5:
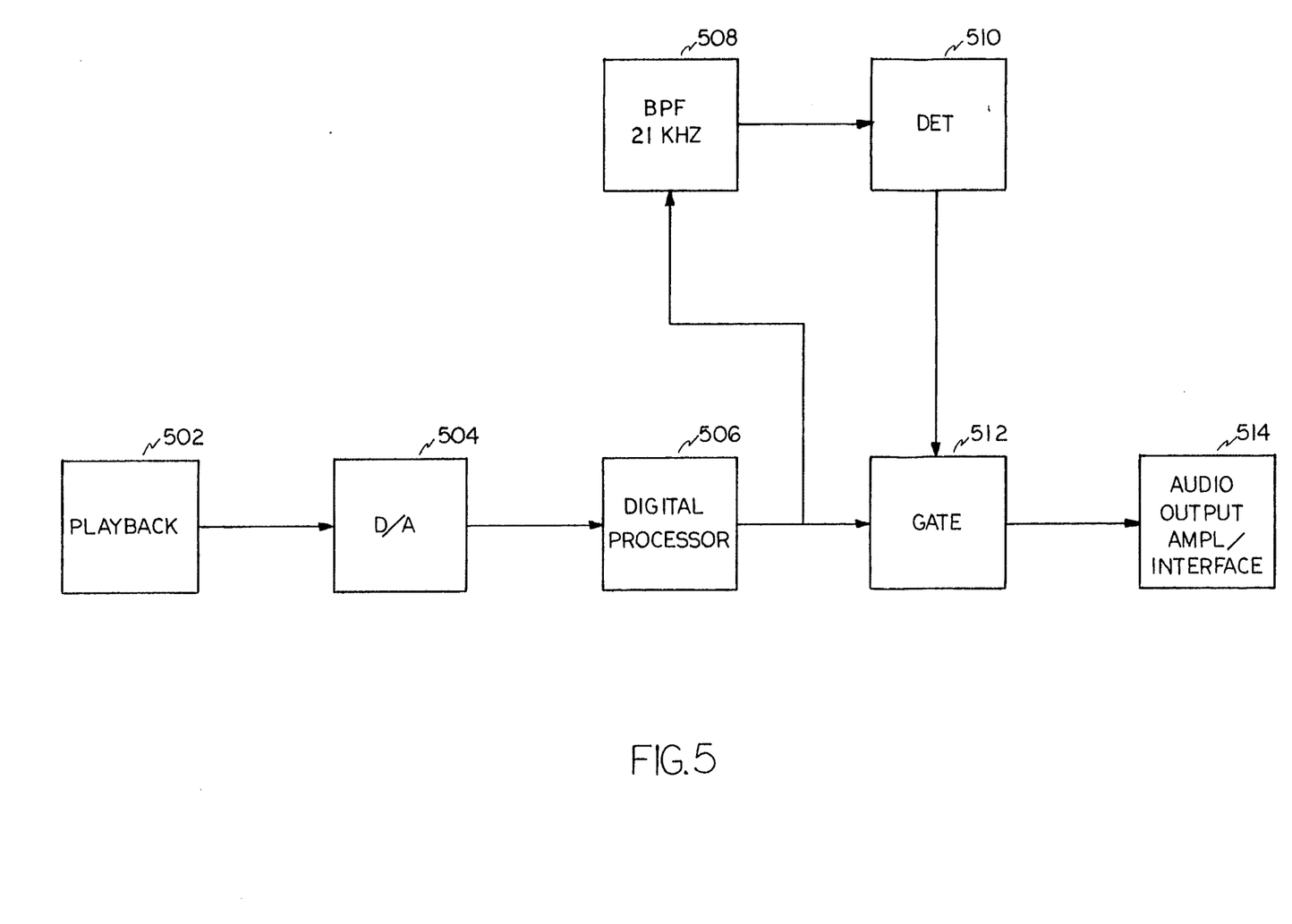
FIG. 5 is a block diagram of a playback system, including means for removing audible clicks without destroying the inaudible protection identification.

FIG. 5, block diagram described below, provides gating which can offer 60 db or more of attenuation to such sharp clicks. The clicks must be timed for insertion in an instantaneous quiet moment in the recording or a zero crossing point. By use of sample and hold type circuits in the playback equipment, it is also possible to insert a click during constant amplitude moments in a wave shape. To remove the clicks, the circuit would interrupt sampling so as to make certain that sampling is not performed during the duration of clicks. However, necessary circuitry in the consumer equipment would be simple if clicks are only placed during zero crossing or silent periods. Also visual artifacts, such as flashing lights or visual distortions in the black and white signal or the color signal, may be used to implement this invention for motion picture applications. However, in most applications, even for VCR's and motion picture films, audible artifacts will suffice.

The means and methods for introducing visual artifacts would be apparent to those of ordinary skill in the video and motion picture fields. Early Pay TV encoding systems, such as applicants U.S. Pat. No. 3,333,052 entitled "Communications Encoding and Decoding System Employing Selective Attenuation and Phase Shifting of Synchronizing Signals and Harmonics", issued on Jul. 25, 1967, described some of these early procedures for introducing visual artifacts. This patent is incorporated by reference herein.

It is also possible to create audible artifacts in the digital stream by say, adding pulses at the correct time slots to avoid correction by the error correction circuitry. Furthermore, it is possible to make the error correction format, used in the preparation of the recordings sold to the public, incompatible with the normal error correction used in the playback. Circuitry would then be incorporated in the playback units that would recognize the copyright signature and then switch the error correction mode to one compatible with the code used in the protected recorders.

Of course, whenever the playback circuitry identifies protected material, the equipment not only removes the audible artifacts, but also disables the associated recording unit. The protected recording would, as per the teachings of the instant invention, also include inaudible protection processing that would disable all tape recorders equipped with the disclosed protection circuitry.

One important advantage to adding inaudible artifacts to the analog signal in most cases (in addition to an inaudible artifact or protection signature to the digital stream) is that it will allow recording firms to protect all types of recordings; including, DATs, CD's, VCRs and importantly, the sound track of a motion picture film that are to be used with existing playback equipment. Digital protection signals alone would not provide protection as the output of existing playback units could be recorded by even protected recorders.

The present invention protects pre-recorded material from unauthorized copying by:

a) Generating a wave representing the program material, b) causing audible artifacts to appear along with the desired program material wave, or making the recording incompatible with existing standards so as not to interfere with playing back recordings on unprotected combination record/playback machines, c) causing an inaudible protected material identification signal to also appear along with the program wave, and d) making copies of a recording incorporating the program material wave and the results of steps b) and c).

One embodiment of the invention provides the means for removing audible artifacts in the form of clicks (dc pulses) from material protected by the addition of clicks to the program wave during certain periods when the program wave has a constant voltage and which is combined with a pulsed super ultrasonic sine-wave that is only present during the active period of the clicks and where means are provided for detecting the presence of the pulsed sine wave combined with means for attenuating the clicks which said attenuating means are controlled by the pulse sine wave detector output.

A preferred means for providing the inaudible copyright identification signal in the analog (baseband) utilizes the phase insensitivity of the human ear.

It is well known that substantial amounts of phase scrambling; i.e., causing certain components of voice and music waves to have a phase characteristic different from the original signal, is not noticeable to listeners.

Indeed, a product called Symmetra-Peak, which is described in the applicant's U.S. Pat. No. 3,060,389 has been used for many years at both AM and FM broadcast stations, even though the Symmetra-Peak dramatically shifts the phase of high frequency components relative to low frequency components. Even small frequency translation errors, common to carrier telephone systems, are undetectable by normal listeners.

When such a processed recording is used with the appropriate consumer recording equipment, it allows sensing circuitry to detect the fact that the recording should not be copied. This circuitry would cause the recorder to interfere with the proper recording or copying of the material.

The instant invention provides protection against the unauthorized copying of recorded material by using inaudible phase modulation of the components of the recorded program material to provide the inaudible copyright identification signal.

Consumer type recorders would contain means for sensing the presence of the inaudible phase modulation of at least some of the audio components for the recorded material that is present on protected DAT recordings or any other protected recording such as CD or analog cassettes and these consumer recorders would incorporate means for interfering with the operation of the recorders when the sensing means senses the presence of the inaudible phase modulation. Other methods for providing inaudible protection signals that may be used in lieu of phase modulation include those based upon the "masking" phenomena. For example, see Cook U. S. Pat. No. 4,086,634, "Method and Apparatus for Preparing Recorded Program Material to Prevent Unauthorized Duplication by Magnetic Tape Recording" and its cited prior art which is incorporated by reference, but the phase modulation system has advantages including lower cost of implementation in the consumer type recorder and superior difficulty to defeat the system.

For details concerning "masking" see "Researches in Acoustics" Alfred M. Mayer, Philos. Mag. 2:500–507 (1876). Other, more recent publications treating this subject include: "Speech and Hearing in Communications", Harvey Fletcher, D. Van Nostrand Co., 1953, pages 153–175 and "Handbook of Experimental Psychology," edited by S. S. Stevens, John Wiley & Sons, 1951. For a better understanding of the present invention, together with other and further objects thereof, reference is made to the following, taken in conjunction with the accompanying drawings and its scope will be pointed out in the appended claims.

PREFERRED EMBODIMENTS

Figure 1:
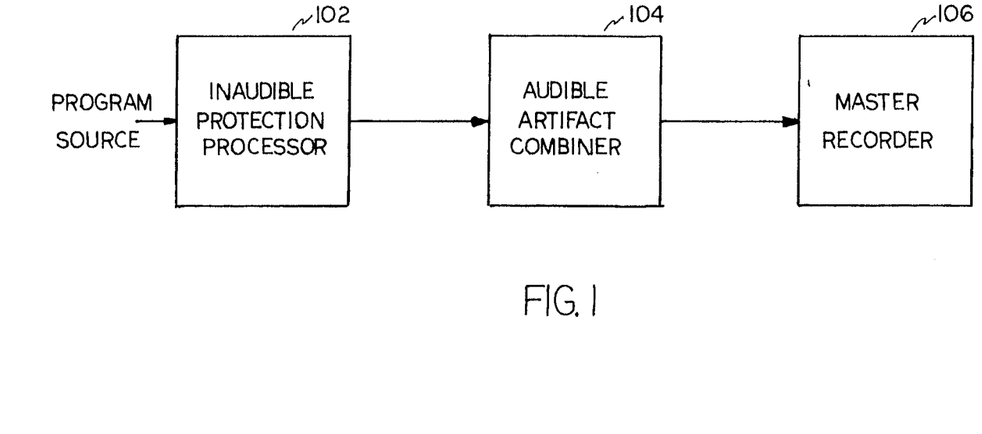
FIG. 1 is a simplified block diagram of a basic embodiment of the present invention as applied to the manufacturer of protected master recordings.

FIG. 1 is a simplified block diagram of the overall procedure for protecting recorded material from unauthorized copying. The source of program material which, of course, would in most cases be a stereo signal, feeds block 102. Block 102 imparts an inaudible protection signal on or with the program material. The output of this block, 102, feeds block 104 which introduces audible artifacts along with the desired recorded wave. The output of 104 feeds the master recorder which may be a digital recording device such as digital audio tape recorder. Compact discs, suitable only for use with playback units, would not use block 104 because there is not reason to provide protection circuitry in playback only equipment. However, block 102 is required if the recordings are to be protected by circuitry described herein.

Figure 2:
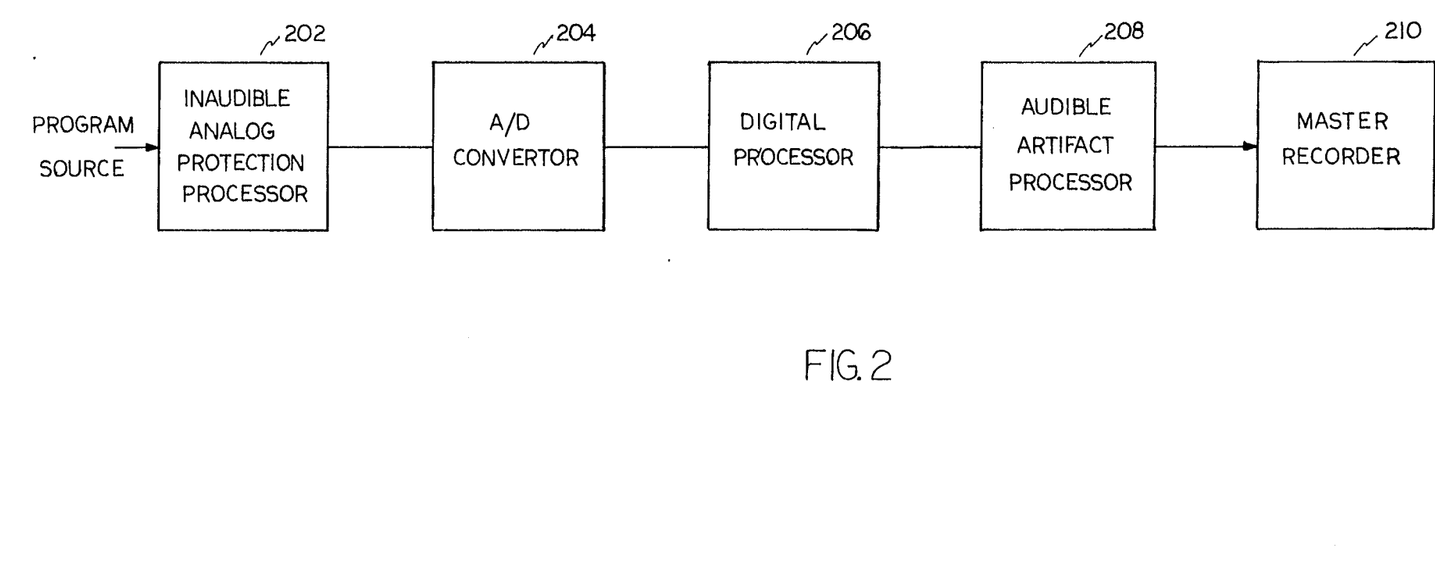
FIG. 2 is a block diagram, showing one embodiment of the invention for manufacturing protected master recordings.

FIG. 2 shows one preferred embodiment of the invention for introducing both audible and inaudible protection processing. A program source feeds block 202 which processes the program wave so as to incorporate an inaudible protection identification characteristic. The output of 202 feeds an analog to digital converter. Block 204 includes, for example, anti-aliasing LPF filtering, sample/hold circuitry, and block circuitry suitable for converting the analog wave to a digital wave. The system, in almost all situations, would accommodate stereophonic program material. The resulting digital stream feeds a digital processor 206 which may include circuitry for introducing error correction coding and would be of conventional design known to those skilled in the DAT art. The output of the digital processor feeds block 208 which adds erroneous information to the digital stream causing audible artifacts when the recording is played through unprotected digital equipment. In other embodiments of the invention, audible artifacts are added prior to the A/D conversion. The output of 208 feeds a master recorder of the same type as block 106 of FIG. 1.

In a preferred embodiment, FIG. 2 would incorporate, as part of the digital processing, a copyright signature signal. This inaudible protection signal would be used to disable the recording function of a properly constructed combination playback/record unit. By providing such a "signature", protection of suitably equipped digital playback/record units would not depend upon the inaudible identification signal that is produced by block 202.

However, the inaudible analog protection provided by block 202 would still be required in order to thwart the copying of the analog version of the signal.

Figure 3:
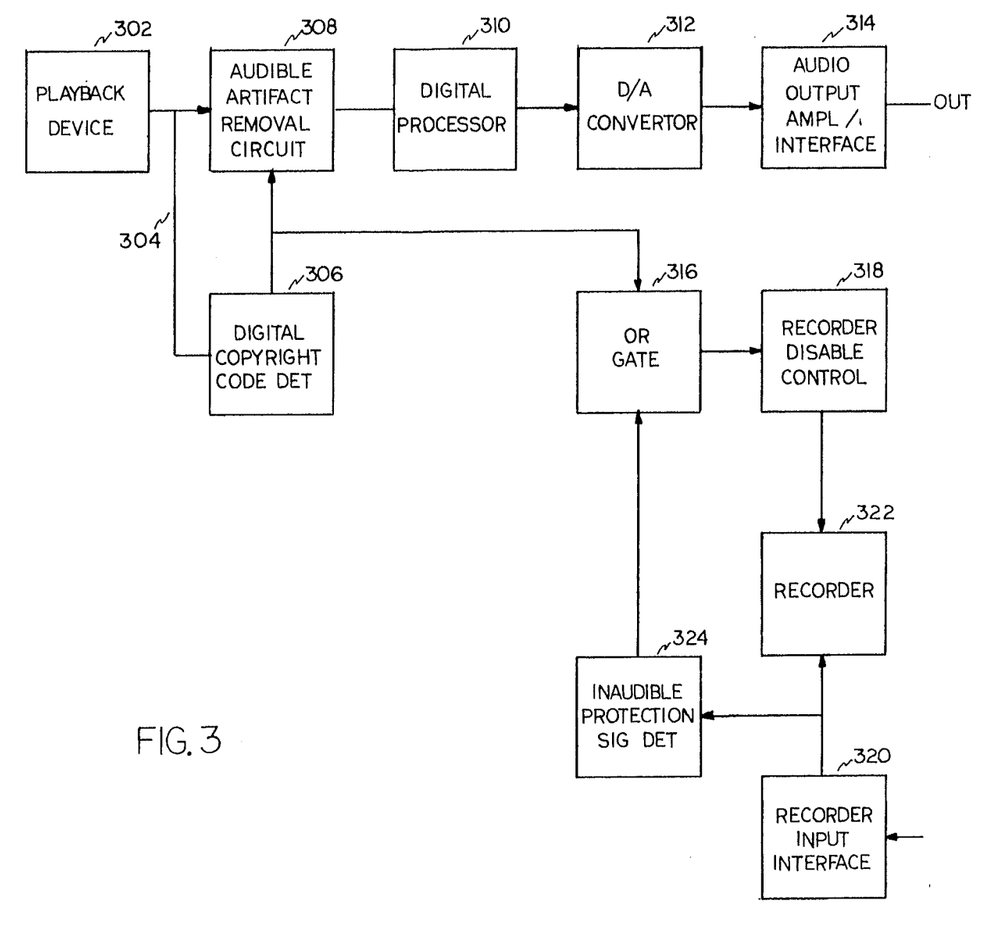
FIG. 3 shows a block diagram of a playback and tape recorder in accordance with the instant invention.

FIG. 3 shows, in block form, a combination DAT playback and recorder equipped to provide program material protection. The playback function is compatible with both protected and unprotected material. If the playback is to be used for listening to unprotected material, the output of playback device 302 is a normal digital stream on line 304 and it is free of audible and inaudible protection artifacts.

Accordingly, the digital stream passes through block 308 without alteration of the digital stream.

The wave is then fed to a normal digital processor, 310, which may include, for example, error correction circuitry. Block 310, in turn, feeds digital to analog converter 312.

The resulting audio wave then feeds block 314 which includes an audio amplifier and interface circuitry to feed, for example, loudspeakers. Typically, this equipment would be equipped for stereophonic operation.

In the recording made, assuming that the signal to be taped is unprotected, block 320 would feed the recorder circuitry 322 and the protection circuitry would remain inactive.

Let us now assume that a protected tape is played back and that the output of block 302, appearing on line 304, includes anomalies in the digital stream that must be removed if reasonable sound is to be produced.

This digital stream would also include, in one preferred embodiment of the invention, a digital copyright code signal. This code signal would be detected by block 306. 306 would then cause block 308 to remove the artifact producing anomaly in the digital stream. One such anomaly may be extra pulses.

The output of 308 would then be a "clean" digital stream which would then be processed in a normal fashion by block 310 which in turn feeds the digital to analog converter 312. The resulting good quality analog wave is fed to the audio output amplifier in phase block 314. Block 312 would include a low pass filter and other circuits required for low distortion D/A conversion.

Block 306, the digital copyright code detector, which also feeds OR gate 316 which in turn feeds a recorder disable control circuit 318. Control circuit 318 disables recorder 322 whenever block 306 senses the copyright code signal. Thus, attempts at making copies for the protected material by connecting the analog signal output of block 314 to the recorder input block 320, would be thwarted.

The device, in its preferred embodiment, will also provide protection against copying from other equipment such as a second digital tape recorder once the material is freed of the undesirable artifacts or the output of a CD playback.

Now, let us assume that an individual has a playback machine which would comprise only blocks 302, 306, 308, 310, 312 and 314. This playback-only device would produce "clean" audio signals which would sound suitable for copying. However, such a wave would still be protected by the circuitry disclosed; for example, application Ser. No. 07/393,300, now abandoned or other inaudible protection signal devices including those based upon the "masking" phenomenon.

Let us assume that this clean, but protected, audio is fed to the interface block 320. The output of block 320 would feed block 324, the inaudible protection signal detector. Protection detector 324, would for example, be designed in accordance with the teachings of application Ser. No. 07/395,300, now abandoned which method of protection is applicable to the production of the CD or DAT records. The output of this signal detector would in turn feed OR gate 316 which in turn would feed the recorder disable control circuit 318 causing recorder 322 to interrupt its recording function, thus protecting the copyrighted material.

Figure 4:
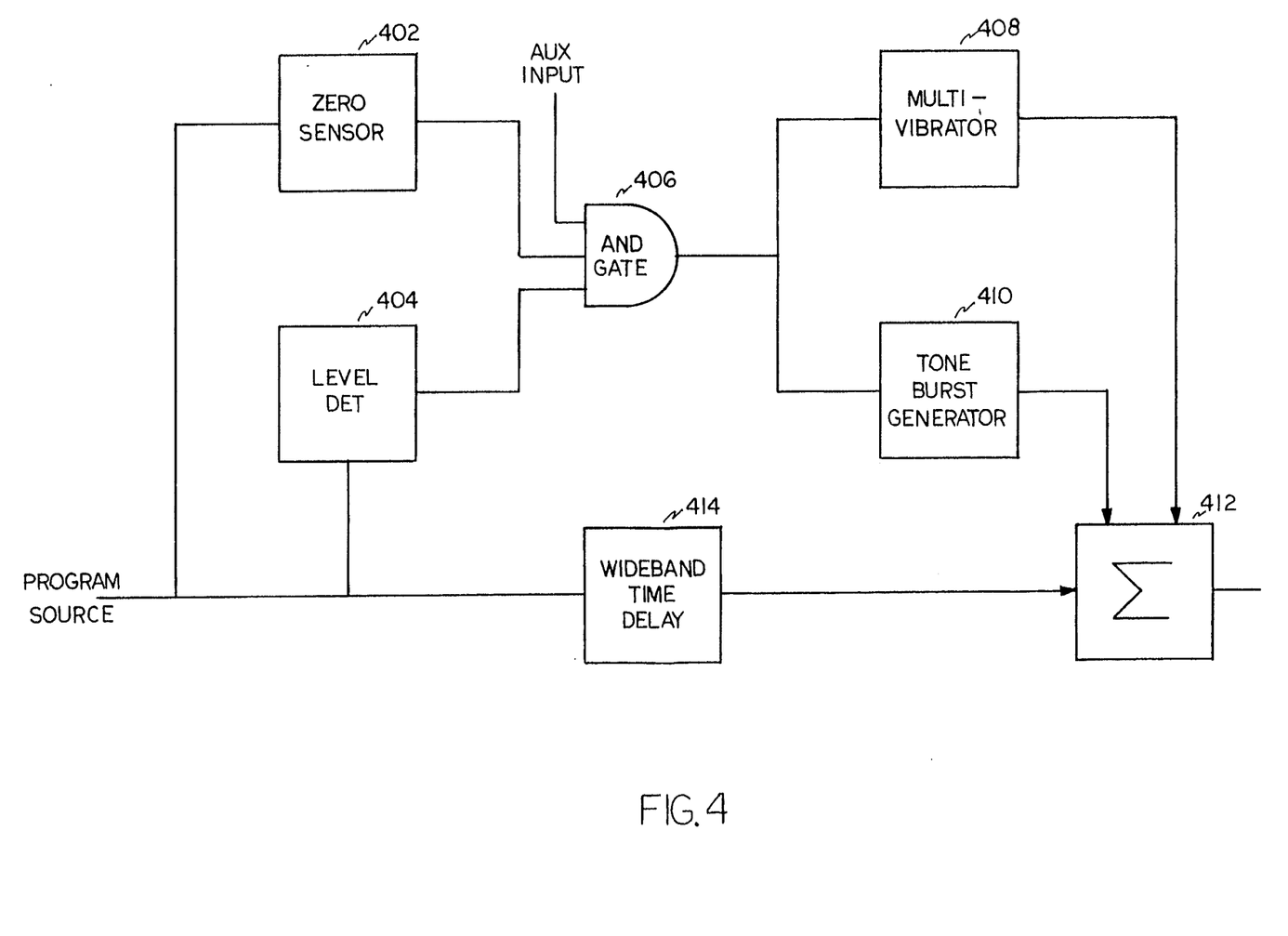
FIG. 4 provides additional details in block form of an audible protection processor block 104 of FIG. 1.

FIG. 4 shows an embodiment of the invention wherein click type artifacts are added to the pre-recorded signal. The clicks are, in this embodiment, combined with the desired signal prior to A/D conversation. Thus, in FIG. 2, block 208 would be placed ahead of block 204 either immediately before or after block 202.

The program material is fed to a zero sensing detector 402. It is important to find a zero so that when the blanking circuits in the playback unit operate, a hole is not put in the desired signal. It is also possible to add clicks to non-zero voltage signals if the signal maintains a constant voltage or plateau for, say, at least 2 ms. In such cases, a sample and hold (S/H) circuit could be used in the playback to hold the last signal voltage available prior to the initiation of click or pulse. However, for most applications using zero crossing or idle periods is preferred and simpler to implement.

Block 402 of FIG. 4 feeds AND gate 406 which causes multi-vibrator 408 to produce a series of clicks. In one embodiment of the invention, block 408 would produce a burst of pulses whenever AND gate 406 is in the logic "1" condition, say, having a duration of a 100 microseconds spaced by, for example, 300 microseconds.

Also fed to AND gate 406 is the output of level detector 404 which monitors the level of the program source. Clicks are more effective during weak level periods, therefore, it is important to monitor the program level and only activate AND gate 404 during weaker passages in the music.

A second input to 406 can be fed to the auxiliary inputs port. One such input would be the status of the circuitry that provides the inaudible protection identification signal. Click generation should normally be avoided during instances when the identification signal is present so as to avoid interaction. Therefore, logic "0" should be present on the auxiliary line during inaudible identification periods. Another auxiliary input might be provided by a spectrum analysis of the program material so as to avoid substantial masking effects that tend to reduce the effectiveness of the clicks.

Yet another input on the aux input line might monitor the click burst rate. It is believed that a burst rate of at least 5 bursts per minute will provide ample protection.

The optimum locations of clicks are somewhat a subjective matter. Furthermore, the type of program material being protected will greatly influence the efficiency of the click protection. For example, voice or classical music or other program material with a large dynamic range would be significantly easer to protect than music with little dynamic range such as many rock records.

It is possible to audition the recording one or more times prior to the insertion of the clicks so as to best locate the placement of the clicks. A computer storage system, plus an accurate timing mechanism, would allow pre-programmed click generation. However, FIG. 4 will allow the placement of clicks in a satisfactory manner because it provides a wideband time delay circuit 414 which delays the program material for, say, at least 2 or 3 milliseconds. This allows the zero sensor sufficient time to provide information to the AND gate 406 that a particular segment of the recording has zero signal level for at least 2 milliseconds allowing the insertion of a 4 or 5 click burst.

In other words, the time delay circuit, in effect, allows the equipment to look into the future at least for a few milliseconds to determine what will be happening to the program material. The level detector 404 also supplies information as to the level of the signal to avoid click insertion during loud program passages. A series of clicks just immediately before the recording and just after the recording, provides additional protection without the difficulty of locating proper program conditions and is a preferred arrangement to provide at least minimum protection.

One of the outputs of gate 406 activates multi-vibrator 408 which produces the click burst. This pulse burst is added to the signal in summation circuit 412. Gate 406 also controls tone burst generator 410. The control to turn on the tone burst should be initiated a short period before the click circuit 408 is activated. The tone burst is used in the playback equipment to activate circuitry that eliminates the click burst and therefore some time is needed to energize the click protection circuit. A delay of the control wave from block 406 to block 408 of say 100 microseconds, should suffice. This delay can be provided by a simple RC circuit in the path of multi-vibrator 408. The frequency of the tone produced by tone burst generator 410 should be above the passband of the program material, for example, in the range of 15 to 22 Khz, typically 21 Khz.

The time delay circuit 414 may use well known circuitry, for example, charge coupled bucket brigade integrated circuits. Much of the circuitry in FIG. 4 can be implemented with microprocessors.

FIG. 5 shows, in block form, a playback circuit suitable for removing click type audible artifacts. This playback unit would normally be part of a combination playback and recorder. While the blocks of FIG. 5 would serve the same purpose as block 308 of FIG. 3, unlike the arrangement shown in FIG. 3, the removal of the audible artifact takes place after the digital to analog conversion step.

The resulting analog wave feeds bandpass filter 508 which passes, for example, the 21 Khz tone burst; the presence of which indicates that the clicks are imminent. The output of filter 508 feeds a detector 510. The resulting pulse representing the envelope of the tone burst, from 510, causes gate 512 to blank the click. The timing of the overall circuitry, including the time delay provided by the control function of FIG. 4 of the click, is such, as to cause gate 512 to operate at the correct instant so as to protect the system from the audible clicks by providing at least 60 db of attenuation.

As mentioned above, during the production of the master recording, it is practical to rerun the taped material. Therefore, equipment can be used to search for the best conditions for inserting the click pulse.

The timing of the clicks should be selected to meet the following criteria:

1) The clicks should only appear, for the best operation of the simplest embodiment of the circuit for removing the clicks, at zero crossings or when the program is absent.
2) A sufficient number of click bursts should be introduced during the course of the recording so as to discourage unauthorized use of the program material. It is believed that a click burst rate of 5 per minute will be satisfactory. Indeed, recordings will be provided significant protection if clicks are present only immediately before and immediately after the program material.
3) The clicks in certain embodiments of this invention, should not occur simultaneously with inaudible processing so as to avoid any possible interaction.
4) The amplitude of the clicks should be less than the normal full amplitude of the program material so that the clicks cannot be removed by special unauthorized noise blankers.
5) The clicks should be present following significant loud passages where other psychological effects may be present which would mask the clicks.

It is interesting to note that since the main reason for utilizing this invention is to cause consumers to purchase DAT recorders, or other combination playback/recorders, with very high quality characteristics that incorporate circuitry that will not copy protected recordings. Thus, it is not necessary that every recording incorporate audible artifacts. Consumers will not buy playback/recorders that do not work with almost all recordings that they expect to use.

Therefore, if an occasional recording is produced with little or no audible artifact protection, it does not create an irreparable situation. Indeed, even if certain recording firms fail to cooperate in implementing a program of incorporating the click introduction, as long as one or more important recording firms do, most consumers will still find it best to purchase protected playback record units.

Also, as mentioned above, significant protection is provided by merely introducing clicks just immediately before the program material appears and immediately after the program material. If the clicks are placed very close to the program, it is difficult, if not impossible, for users without special equipment to remove all the clicks.

A preferred embodiment, processes recorded material in such a manner so as to make the analog (baseband) inaudible copyright identification signal detectable with relatively simple equipment. On the other hand, the processing of the audio signal does not produce audible artifacts that would disturb listeners.

The instant invention provides protection against the unauthorized copying of recorded material by introducing inaudible phase modulation of frequency components of the recorded material prior to sale of the recording to consumers. In the preferred embodiment of this invention the rate of the phase modulation is very low, generally less than 25 Hz.

The system would require the installation of circuitry in consumer recorders for sensing the presence of the inaudible phase modulation of at least some of the audio components of the recorded material and the consumer recorders would incorporate means for interfering with the operation of the recorders when the sensing means senses the presence of the inaudible phase modulation.

Figure 6:
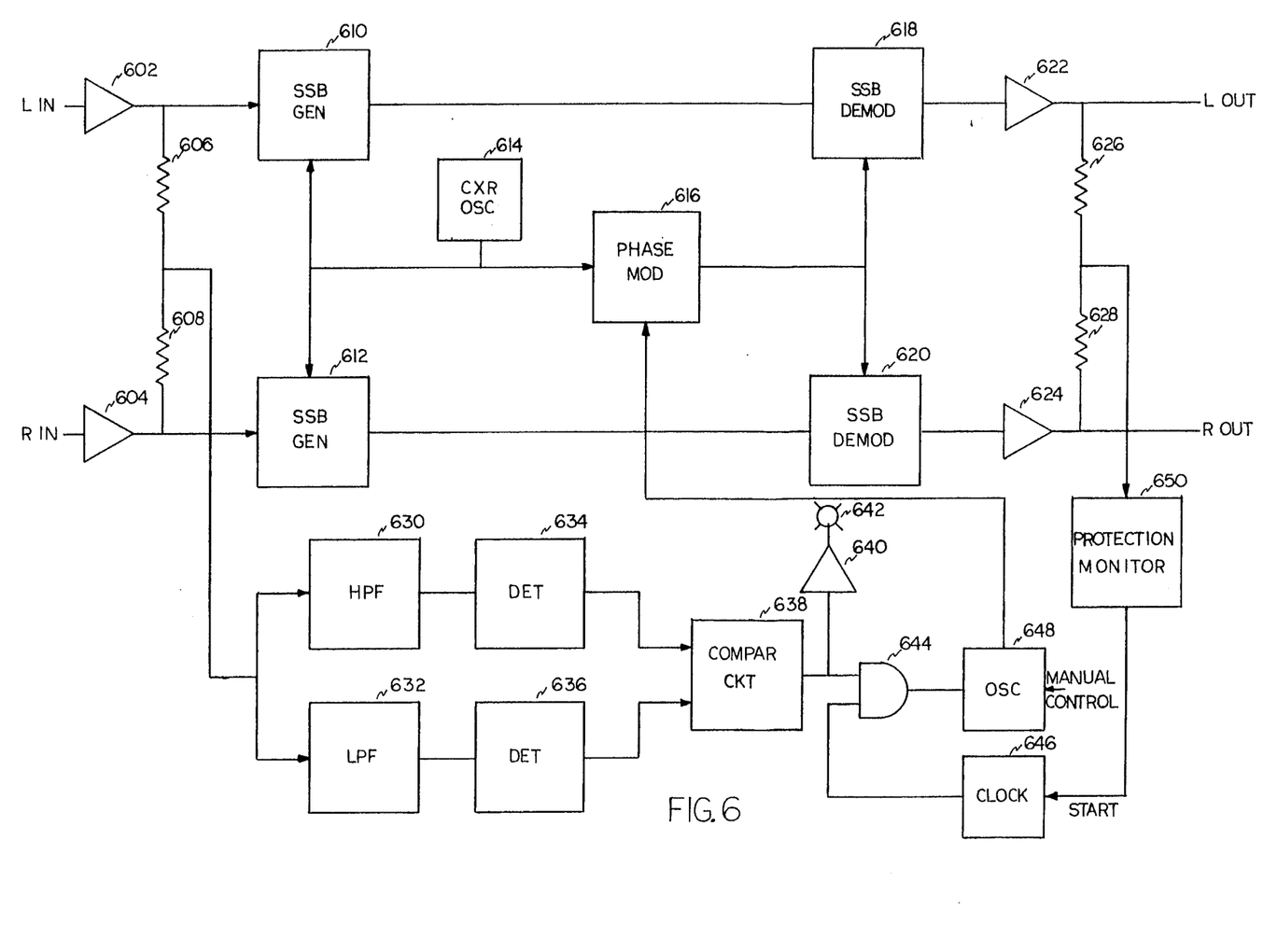
FIG. 6 is a block diagram of the processing circuitry that causes the recorded music or voice waves to carry the special identifying characteristic.

FIG. 6 shows one embodiment of the invention which can be used to process the audio signal being recorded so as to impart an inaudible identifying signal.

This inaudible identifying signal takes the form of phase modulation of substantially all of the frequency components of the material being recorded during certain periods of time. This protective signal can be used to control suitably equipped consumer type recorders that sense the presence of the inaudible phase modulation and energize circuits that interfere with the operation of the recorder, thus protecting against unauthorized copying.

The embodiment of the invention shown in FIG. 6 illustrates means for protecting a typical two channel stereo recording. Those skilled in the art will recognize that this same invention can be used for protection of monophonic, quadraphonic, or other types of recordings.

The left (L) and right (R) inputs which comprise the normal stereo program signals are fed to amplifiers 602 and 604. The output of these amplifiers are fed to individual SSB generators 610 and 612. Carrier oscillator 114 feeds the two SSB generators 610 and 612. The output of the SSB generators in turn feed SSB demodulator 618 and 620 restoring the stereo L plus R signals. As discussed infra the SSB generators and SSB demodulators are conventional and a number of design procedures may be used in practice.

In order to produce the identifying phase modulation instead of carrier oscillator 614 being connected directly to SSB demodulator 618 and 620, the carrier signal is passed through a phase modulator 616. This phase modulator would typically produce ±10 to 20 degrees of phase modulation at a low frequency rate, for example, below 25 Hz. The result is, that when phase modulator 616 is activated, all program signal components at the output of the SSB demodulators 618 and 620 are phase modulated.

Since at least all of the significant stereo signal components are simultaneously phase modulated, there is substantially no relative phase modulation between components increasing the difficulty of normal listeners detecting the presence of the identifying signal. This is especially true if the periods during which the phase modulation is imparted is short in duration and the signal conditions are selected so as to make it particularly difficult to hear the phase modulation.

An example of program material that should not be phase modulated is one that will be substantially only very low frequency program components. Phase modulating such a signal could be audible to discerning listeners. Accordingly, circuitry is provided for delaying the use of phase modulation until signal conditions are present where low frequency sounds do not predominate.

The output of the SSB demodulators 618 and 620 feed amplifiers 622 and 624 which in turn feed recording equipment so as to produce recordings of the protected L and R signals. Amplifiers 622 and 624 also feed a simple resistive summation circuit 626 and 628. The resulting L+R signal feeds a protection monitor 650. This protection monitor 650 simulates the circuitry which would be provided in companion consumer recording equipment for which the protection is provided.

Thus, protection monitor 650 senses the presence of the phase modulation produced by phase modulator 616. In a typical design the output of protection monitor 650 would be, for example, +5 volts when the monitor detects the presence of the identification phase modulation signal. When phase modulation is absent, the output will be, for example, 0 volts. Further details of an example concerning this protection monitor are provided infra in the discussion of FIG. 7.

Protection monitor 650 feeds an elapsed time clock 646. Typically clock 646 will time, for example, 1.5 minutes from the last instant when the protection monitor indicated that protection was provided and produced a start signal for clock 646. The exact amount of elapsed time is not critical and, indeed, may, in a preferred embodiment, be variable.

The constraints of the time is that protection should not be provided too frequently minimizing the possibility of a very discerning listener hearing artifacts and, on the other hand, providing sufficient protection so that if the protection circuit in a consumer tape recorder with poorly constructed protection circuitry misses the first two or three protection signals, protection will still be provided. Actually, a preferred design, according to FIG. 6, will provide protection during the first few seconds of the recording, assuming that the program material at the beginning of the recording does not comprise substantially only low frequency sounds.

After the first protection signal is provided, the protection signal should be disabled for; as an example, say 1.5 minutes. Thus, the clock output will be +5 volts after 1.5 minutes as timed from the last protection signal as sensed by protection monitor 650. The output of the clock prior to receiving the first "start" signal from the protection monitor should also be +5 volts.

The clock output feeds AND Gate 644. The other input to AND Gate 644 is generated as follows:

An L+R sample is derived from the outputs of amplifiers 602 and 604 through resistive summation circuit 606 and 608 and feeds high-pass filter 630 and low-pass filter 632. In one embodiment of this invention the crossover points on the high-pass and low-pass filters would be; for example, 400 Hz although a wide range of designs would be suitable.

The output of the high-pass filter 630 feeds detector 134 and low-pass filter 632 feeds detector 636. The resulting dc voltages are fed to comparator circuit 638 only when the high-pass filter output as measured by detector 634 is stronger than the low-pass components as detected by detector 636. Thus, comparator circuit 638 produces a positive voltage when the high and mid frequencies predominate. This positive voltage is then fed to one of the inputs of AND Gate 644. The output of the comparator circuit also feeds an LED drive amplifier 640 and LED light 642 for use in adjustments and also for manual control operation as discussed below.

It should be noted that comparative circuit 638 would incorporate hysteresis so that if the outputs of detectors 634 and 636 are both small, indicating a quiet or very low audio level part of the recording, comparator circuit 638 will remain in the "off" conditions; i.e., that its output is 0 volts. Therefore, comparator 638 will produce a +5 volt output only when two conditions occur: 1) that reasonable signal levels are present; i.e., say for example, signals greater then 20 db below the normally expected full amplitude signals, and 2) that the signal, at that time, is composed of primarily mid and high frequency components. It is noteworthy that the −20 db signal level may require modification for certain types of very wide dynamic range signals. Under those conditions, an adjustment in the comparator circuit might be set; for example, to −30 db. Conversely, where music has a very small dynamic range it might be preferable to set the levels to say −12 to −15 db rather than −20 db.

Accordingly, adjustments may be provided in comparator circuit for amplitude and, indeed, where unusual compositions must be treated even the ratio of the output of detectors 634 and 636 might require adjustments. As a practical matter, sample runs can be made to test that the adjustments provide proper protection.

Conversely, critical listening should be performed on protected material to make certain that the protection is completely inaudible and that new adjustments need not be made.

AND Gate 644 produces, for example, +5 volts when the output of the clock 646 and the output of comparison circuit 638 both indicate operate conditions; i.e., that the correct amplitude and frequencies of the source material is present and that a protective signal was not provided in less than say 1.5 minutes previously. The AND Gate 644 then causes oscillator 648 to produce a low frequency audio wave that is fed to phase modulator 616 producing the desired phase modulation of the recorded signal components.

It is useful to consider how the system would operate under typical conditions. The recording material to be protected would be fed to the L in and R in terminals. The outputs of high-pass and low-pass filters 630 and 632 would cause dc levels to be produced at the output of detectors 634 and 636.

Under initial conditions, clock 646 will have an output of +5 volts because the clock would not be energized by the "start" signal from protection monitor 650. Accordingly, as soon as comparison circuit 638 determines that the level and frequency content of the recorded material is appropriate for introducing the protection signal, AND Gate 644 will produce an output of, for example, +5 volts keying on oscillator 648 and producing phase modulation from phase modulator 616. Thus, typically, the protection will be provided early at the beginning of the recording. This early action should inhibit the consumer recording equipment from copying even the beginning portion of the recording.

However, if for some reason the circuitry in the consumer tape recorder does not sense the presence of the protection signal, the interval timer clock 646 will, in conjunction with the comparison circuit 638, cause a second protection signal. Furthermore, throughout the recording, at time intervals set by clock 646 and comparator circuit 638, additional protection signals will be provided.

It is possible that the recording only has short intervals when the amplitude and the frequency characteristic of the program material is proper for providing protection but such conditions should be rare.

It should also be noted that before production of quantities of copies are made, the recording engineer would carefully check that sufficient protection is provided. On the other hand, the engineer would make certain that undesired phase modulation artifacts are absent.

Also, in cases of certain atypical music recordings, where it is difficult to meet the desired conditions for introducing the phase modulation, it is possible for the recording engineer, by use of the manual control of oscillator 648, to introduce phase modulation at desired periods. Such manual operation would be aided by the engineer preauditioning the recording and also by watching LED 642 for an indication of the presence of the preferred spectral content of the program.

Circuitry is provided in the preferred embodiment of this invention for providing intermittent presence of the protection signal because of two reasons:

1) If the phase modulation is on at all times the probability is increased of this modulation being detected by critical listeners during passages where certain sensitive frequency components are present; and,
2) Continuous phase modulation would make it simpler for individuals to defeat the encoded technique by merely cancelling the phase modulation with out-of-phase phase modulation, during the entire recording.

The specific phase modulation embodiment, which is one of a number of possible embodiments, as illustrated in FIG. 6, incorporates a single-sideband (SSB) generator, or modulator, and an SSB demodulator. The SSB modulator or generator 610 and 612 produces either an upper or lower sideband wave. The choice of carrier frequency and the determination of which of the sidebands is selected, i.e., upper or lower sideband, is a design decision which should be based upon the avoidance of undesired frequency components and the availability of equipment.

A number of SSB generators suitable for use in this application are well known in the prior art including the filter type, phase-shift type, etc. Such designs are well within the capability of those skilled in the SSB technology art as described in a number of text books and an early Proceedings of the IRE, SSB Issue, December 1956. A combination of techniques might be useful; for example, a phase-shift type generator backed up or supported by a SSB filter. A carrier frequency of 100 Khz is often used, although 455 Khz, 500 Khz and other frequencies are quite common.

The desired identifying phase modulation is achieved by generating an SSB suppressed carrier wave and then demodulating the generated SSB wave by use of a product demodulator with the same carrier. However, the carrier used in the product demodulator is phase modulated in block 616.

Instead of using an SSB demodulator incorporating selectivity against the undesired sideband it is possible to use merely a product demodulator. Conversely, it is possible to produce a double-sideband suppressed carrier wave in blocks 610 and 612 and perform the sideband selection in the SSB demodulators 618 and 620. In other words, the sideband selectivity can be introduced in SSB generators or demodulators, or both.

Identical circuitry is preferably incorporated in the L and R channels. Since a common phase modulator (616) is used, the tracking under temperature and time of the two circuits should be excellent. It is, of course, possible to feed the unmodulated carrier frequency to the SSB demodulator and introduce phase modulation in the carrier, feeding the SSB generators.

Thus, use of sideband generation of modulation and SSB demodulation utilizing carriers that differ by a phase modulation component, an overall phase modulation effect is achieved.

By providing accurate phase modulation of all the signal components, undesired beating effects caused by some audio components being phase modulated to a different degree than others are eliminated.

The frequency selected for oscillator 648 would generally be a subsonic wave in the order of a few hertz to up to say 25 Hz. It is desirable to avoid certain frequencies; i.e., the frequencies of the independent sideband AM Stereo system; i.e., 15 Hz and the 25 Hz pilot as proposed by Motorola in order to avoid the possibility of falsely activating pilot detectors when the processed recordings are broadcast by an AM stereo station.

As pointed out above, not all segments of speech or music wave should be subjected to the phase modulation. For example, phase modulation of very low frequency sustained tones would be more easily disturbed by the superimposed phase modulation component. Therefore, a component, say below 300 Hz, of a sustained nature, would present more of a problem and in most cases would not be a good candidate for phase modulation.

The amount of phase modulation produced in block 616 need not be too large. For example, a phase modulation of +/−10 to 20 degrees should suffice. Using large amounts of phase modulation will increase the probability that highly critical listeners will detect undesired artifacts. On the other hand, too low a value of phase modulation will make it difficult for the sensor in the tape recorders being controlled by this processing to sense the phase modulation.

The processing described in FIG. 6 is capable of operating in what might be called real time. It also can be adapted at a much lower speed so as to provide additional time for processing.

Furthermore, it is possible, by incorporating control circuits with storage, to have the equipment function so as to first pass the recorded music or voice through the system allowing for example, a specially programmed processor to prepare itself for optimum processing during subsequent processing of the recorded material.

This, in effect, would allow the system to look into the future and provide highly optimized performance. The protection monitor function may, in such situations, be built into the microprocessor.

Figure 7:
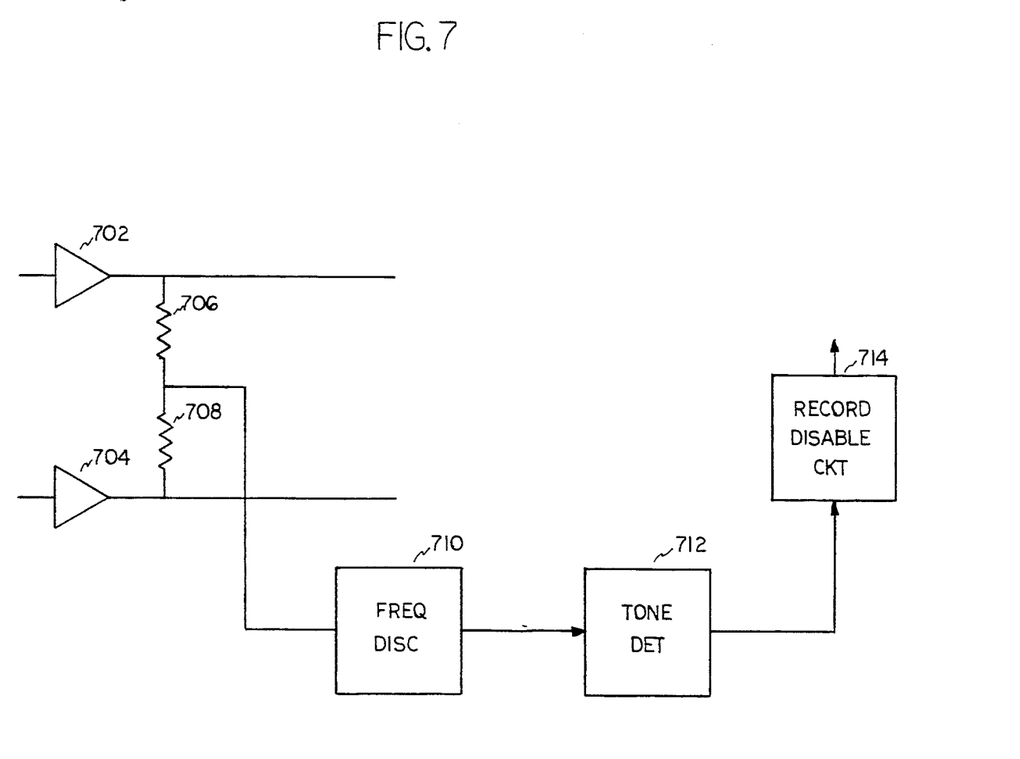
FIG. 7 is a block diagram showing circuitry for sensing the special identifying characteristic carried by the recording as a result of the operation of the circuitry shown in FIG. 1.

FIG. 7 shows a circuit that can be used in conjunction with the processing circuit so as to protect tape recordings, CD recordings, and other forms of recordings from unauthorized copying.

Samples of the L and R inputs to the tape recorder are amplified in amplifiers 702 and 704. The outputs of these amplifiers can feed other circuitry in the tape recorder, but they also feed a summation circuit comprising resistors 706 and 708 which produces an L+R signal.

The L+R signal is then fed to a frequency discriminator. The output of the discriminator will, say for a single tone, produce a dc voltage. If that tone is phase modulated, there will be superimposed on the dc component a tone at the frequency of oscillator 648 of FIG. 6. Complex waves will produce additional components. However, the output wave should always incorporate a component at the rate of the phase modulation; i.e., at the frequency of the oscillator 648 of FIG. 6.

If the encoding circuit of FIG. 6 is structured so that the phase modulation is only added in the presence of say approximately a 3 Khz wave, then the discriminator only need respond to a wave in the region of 3 Khz. Limiting the frequency response of the frequency discriminator will guard against false operation of the equipment causing interference to copying of unprotected material.

For example, if the discriminator had to respond to the entire frequency range of the recording, low frequency components could create outputs at the rate of the phase modulation interfering with the operation of the circuit.

Typically, music and voice waves during periods when the mid and high frequency components predominate, will contain strong components in the 2 to 3 Khz range. Accordingly, the processing shown in FIG. 6 should insure, under normal conditions, sufficient energy in that range to allow frequency discriminator 710 to function so as to provide the desired protection.

The output of the frequency discriminator 710 feeds tone detector 712. The tone detector which can comprise, for example, a NE567 integrated circuit tone detector as manufactured by Signetics of Sunnyvale, Calif. is designed for use in FIG. 7 to detect the presence of tones having a frequency equal to that of the frequency of the oscillator 648 of FIG. 6.

When such a tone is detected for a sufficient period of time, as determined by the time constants of tone detector 712, the output causes the recorder to be disabled.

The time constant must be sufficiently long to insure protection from falsing when the recorder is being used to record unprotected material. As with all such devices, the setting of the time constant and any threshold voltages must compromise "false alarm" errors with "misses". This circuitry activates the disabling function, as included in block 714, which can be a relay or the solid-state equivalent thereof.

Figure 8:
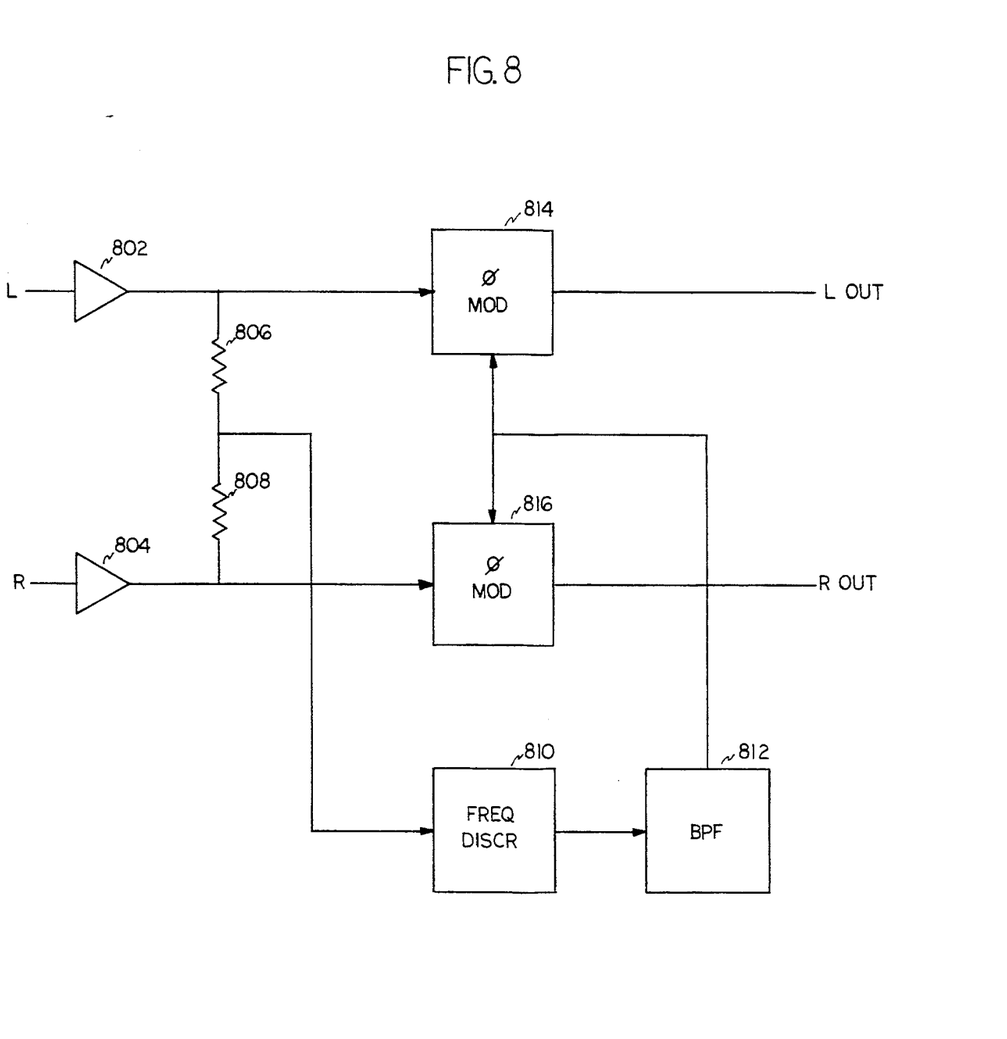
FIG. 8 is a block diagram of circuitry that may be used for combatting the effects of the special identifying processing.

FIG. 8 shows one embodiment of the invention that can be used to remove the effects of the phase modulation processing. One application of such a device would be for radio stations that might wish to remove, or at least reduce, the processing when broadcasting recorded music.

FIG. 8 shows one embodiment of such a circuit using forward acting correction. It will be obvious to one skilled in the art that a negative feedback arrangement could also be used. However, stability considerations probably favor forward acting correction.

Referring to FIG. 8, the L and R input signals are amplified by amplifiers 802 and 804. The outputs of these amplifiers are summed in resistor combiner 806 and 808. The resulting L+R wave is fed to frequency discriminator 810.

The frequency discriminator or phase discriminator will function in a manner similar to block 710 of FIG. 7 and, therefore, one of the components should fall at the frequency of the phase modulation created by the processor; i.e., the frequency of oscillator 618 of FIG. 6.

Accordingly, bandpass filter 812 is set to match the frequency of the phase modulation. The output of the filter is then fed to phase modulators 814 and 816. The amount of phase modulation added should be accurately set to match that of the phase modulation produced in the processing; i.e., phase modulator 616 of FIG. 6. However, the added phase modulation should be 180 degrees out of phase with respect to the original phase modulation so as to cancel the original phase modulation. It should be noted that relatively simple phase modulators 814 and 816 are shown in FIG. 8. Such circuits are well known to those skilled in the art and would comprise an all-pass configuration. However, they are, by nature, relatively narrow band devices and, therefore, even though the entire audio wave would be passed through the two phase modulators, the amount of phase modulation would vary significantly as a function of frequency. This can produce audible artifacts, limiting the usefulness of the circuit.

On the other hand, phase modulators 814 and 816 could be implemented in the same fashion as the phase modulator of FIG. 6. In other words, blocks 610, 612, 614, 616, 618 and 620 of FIG. 6, could be used in FIG. 8 to satisfy the functions of 814 and 816. This would provide wideband phase modulation. However, such a circuit would be expensive to implement for typical users and, therefore, as a practical matter, such circuitry probably would not be used by normal broadcasters not alone in consumer equipment.

While there have been described what are believed to be the preferred embodiments of the invention, those skilled in the art will recognize that other and further modifications, such as the use of different types of audible and inaudible protection signals, may be made thereto without departing from the spirit of the invention, and it is intended to claim all such changes and modifications as fall within the true scope of the invention.

I claim:

1. Apparatus for protecting pre-recorded material from unauthorized copying, comprising:
   (a) a source of program material,
   (b) means for causing audible artifacts to appear along with the desired program material,
   (c) means for causing an inaudible protected material identification signal to also appear along with the program material,
   (d) means for recording and making copies of a wave representing the source material, the audible artifacts and the inaudible identification signal.

2. The apparatus of claim 1 wherein the b) means comprises; means for producing audible artifacts at least just prior to the start of the desired program material.

3. The apparatus of claim 1 wherein the b) means comprises; means for producing audible artifacts at least immediately after the end of the desired program material.

4. The apparatus of claim 2 wherein the audible artifacts are clicks.

5. The apparatus of claim 3 wherein the audible artifacts are clicks.

6. The method of protecting pre-recorded material from unauthorized copying, comprising:
   (a) generating a wave representing the program material,
   (b) causing audible artifacts to appear along with the desired program material wave,
   (c) causing an inaudible protected material identification signal to also appear along with the program material wave, and,
   (d) recording and making copies of the combination of the program material wave, the audible artifacts and the inaudible identification signal.

7. Apparatus for playing back recordings containing purposely introduced audible artifacts, an inaudible identification signal and desired program material, comprising:
   (a) means for playing back recordings that contain said audible artifacts and the inaudible identification signal,
   (b) means for at least substantially attenuating the audible artifacts without substantially attenuating the inaudible identification signal, and,
   (c) means for processing and amplifying the wave freed from audible artifacts so as to interface with one or more electro-acoustic transducers.

8. A playback unit compatible with both pre-recorded protected and unprotected recordings, combined with a recording device compatible with only unprotected program material, comprising:
   (a) means for playing back the recordings so as to produce an audio wave,
   (b) means for removing purposely introduced audible artifacts from the audio wave representing protected pre-recorded material,
   (c) means for sensing the presence of an inaudible protection identification signal, and
   (d) means controlled by (c) means for interfering with the recording function of the equipment for at least a significant portion of the protected program material.

9. Apparatus for protecting pre-recorded program material, comprising:
   (a) a source of program material,
   (b) means for processing the program material so as to make it suitable for storage on a recording medium,
   (c) means for generating audible artifacts,
   (d) means for generating an inaudible identification signal, and
   (e) means for making recordings of a wave containing the source material, said audible artifacts and said inaudible identification signal.

10. The apparatus of claim 9 wherein the recording is a digital tape recording.

11. The apparatus of claim 9 wherein the audible artifacts are created by causing interference to digital recording stream and wherein the inaudible identification signal is introduced prior to conversion of the analog wave to a digital wave.

12. The apparatus of claim 9 wherein the audible artifacts and the inaudible identification signal are introduced prior to converting analog wave to a digital wave.

13. A method for protecting copyrighted recorded program material from unauthorized use, comprising:
   (a) locating at least one pause in the program material,
   (b) generating a pulsed sine wave during said pause, said sine wave having a frequency outside the frequency range of the material to be protected,
   (c) generating clicks at a predetermined time in relation to the start of the pulsed sine wave of Step (b), said clicks having components that fall within the frequency range of the material to be protected,
   (d) combining the pulsed sine wave of Step (b) and the clicks of Step (c) with the program material to be protected prior to duplicating the recorded material;
   and in compatible playback equipment the steps of:
   (e) tone detecting the pulse sine wave generated in Step (b), and,
   (f) blanking out the clicks of Step (c), said blanking being controlled by the tone detecting Step (e).

14. The method of claim 13 wherein step (a) is limited to essentially constant voltage segments of the program wave which occur during passages having an amplitude of less than 10% of the full amplitude of the wave.

15. Apparatus for removing audible artifacts that were purposely combined with the program material from program material protected by the addition of clicks to the program wave during quiet moments in the program wave, and which is combined with a pulsed sine wave that is present during the active period of the dc clicks, comprising:
   (a) means for detecting the presence of a pulsed sine wave; and
   (b) means for attenuating the program wave with the added clicks, said means being controlled by (a) means.

16. The apparatus of claim 15 wherein the frequency of the sine wave is in the range of 15 Khz to 22 Khz.

17. The apparatus of claim 15 wherein the attenuating means, when active, attenuates the output wave to the point of inaudibility.

18. Playback and recording apparatus for use in playing back pre-recorded protected program material and unprotected program material and in recording unprotected program material, comprising:
   (a) means for playing back recorded program material so as to produce an audio wave,
   (b) means for removing audible artifacts which were purposely introduced in protected records when playing back pre-recorded material without removing the inaudible protected material identification signal,
   (c) means for sensing the presence of the inaudible identification signal, and
   (d) means for interfering with the recording function whenever said inaudible identification signal is sensed by (c) means.

19. Digital recordings that are protected against unauthorized copying by incorporating two types of inaudible protected recording identification signals:
   (a) a protection signal in the digital stream of the recording that does not survive the digital to analog conversion means in associated playback equipment, and
   (b) an inaudible protection signal that survives the digital to analog conversion means in the associated playback equipment.

20. The digital recording of claim 19, wherein audible artifacts are incorporated in said recording.

21. A combination digital playback and recording device comprising means for interfering with copying of copyrighted material controlled by means for detecting digital protection signals and means for detecting analog protection signals.

22. A system for providing protection against unauthorized copying of recorded material comprising;
(a) means for introducing inaudible phase modulation of substantially all frequency components of the material to be recorded at least during certain periods of the recording,
(b) means, installed in consumer type recorders, for sensing the presence of the inaudible phase modulation of at least some of the audio components of the recorded material, and
(c) means for interfering with the operation of consumer type recorders when the sensing means senses the presence of the inaudible modulation.

23. The system of claim 22 wherein the rate of the inaudible phase modulation is below 25 Hz.

24. Circuitry for processing recorded music and/or voice signals so as to protect these recordings from unauthorized copying, comprising:
(a) means for sensing periods when medium and high frequency components of said voice and/or music waves are greater than low frequency components,
(b) means for keying on an identifying signal only when
(a) means senses said periods, and
(c) modulation means for modulating said signals with the desired identifying signal.

25. The circuitry of claim 24 wherein the modulation means comprises one or more phase modulation means.

26. Equipment for imparting an inaudible identifying characteristic on recorded material comprising;
means for introducing inaudible phase modulation of substantially all of the frequency components of the speech and music at certain intervals of the recording, and
means for automatically controlling the presence of said inaudible phase modulation.

27. Digital recordings of visual signals comprising:
(a) a protection signal in the digital stream of the recording that does not survive the digital to analog conversion means in associated playback equipment, and
(b) an invisible protection signal that survives the digital to analog conversion means in the associated playback equipment.

28. Playback and recording apparatus for use in playing back pre-recorded protected program material and unprotected program material and in recording unprotected program material, comprising:
(a) means for playing back recorded program material so as to produce an audio wave,
(b) means for removing audible artifacts which were purposely introduced in protected records when playing back pre-recorded material without removing the inaudible protected material identification signal,
(c) means for sensing the presence of the inaudible identification signal,
(d) means for interfering with the recording function whenever said inaudible identification signal is sensed by (c) means, and
(e) where the (c) senses the presence of an inaudible phase modulation of at least some of the audio components of the recorded material, and
(f) the (d) means for interfering with the operation of consumer type recorders is the (e) means that senses the inaudible phase modulation.

29. Apparatus for protecting pre-recorded material from unauthorized copying, comprising:
(a) a source of program material,
(b) means for causing audible artifacts to appear along with the desired program material,
(c) means for causing an inaudible protected material identification signal to also appear along with the program material,
(d) means for recording and making copies of a wave representing the source material, the audible artifacts and the inaudible identification signal,
(e) and wherein the (c) means introduces inaudible phase modulation of substantially all frequency components of the material to be recorded at least during certain periods of the recording,
(f) means, installed in consumer type recorders, for sensing the presence of the inaudible phase modulation of at least some of the audio components of the recorded material, and,
(g) means for interfering with the operation of consumer type recorders when the sensing means senses the presence of the inaudible modulation.

30. A playback unit of claim 8 wherein said playback unit is a VCR.

31. The digital recordings of claim 19 wherein said recordings are VCRs.

32. The apparatus of claim 9 wherein the program material is stored on the sound track of a motion picture film.

33. A recorder for recording speech and music signals incorporating circuitry for interfering with the unauthorized copying of recordings that have been processed so as to impart an inaudible identifying characteristic, comprising:
means for detecting the inaudible identifying characteristic,
said means comprising a frequency or phase discriminator operating in the region of 3 Khz and a tone detector for detecting tone(s) of less than approximately 25 Hz, and,
control means for interfering with the normal operation of the recording device when the inaudible identifying characteristic is detected.

* * * * *